(No Model.)

F. M. POWELL & W. H. VICKERY.
TETHER.

No. 445,454. Patented Jan. 27, 1891.

Witnesses
J. M. Gallaher
Geo. L. Wheelock

Inventor
Francis M. Powell
Wm. H. Vickery

By their Attorneys,
C. A. Snow & Co.

THE NORRIS PETERS CO., PHOTO-LITHO., WASHINGTON, D. C.

UNITED STATES PATENT OFFICE.

FRANCIS M. POWELL AND WILLIAM H. VICKERY, OF HARTWELL, GEORGIA.

TETHER.

SPECIFICATION forming part of Letters Patent No. 445,454, dated January 27, 1891.

Application filed August 29, 1890. Serial No. 363,437. (No model.)

*To all whom it may concern:*

Be it known that we, FRANCIS M. POWELL and WILLIAM H. VICKERY, citizens of the United States, residing at Hartwell, in the county of Hart and State of Georgia, have invented a new and useful Tether, of which the following is a specification.

Our invention relates to that class of devices known as "tethers," which are adapted to be transferred from place to place on a grazing-ground, and to which the animal grazing is attached in such a manner as to permit its necessary movements; and it consists in certain features of novelty to be hereinafter described, and then particularized in the claim.

Figure 1:
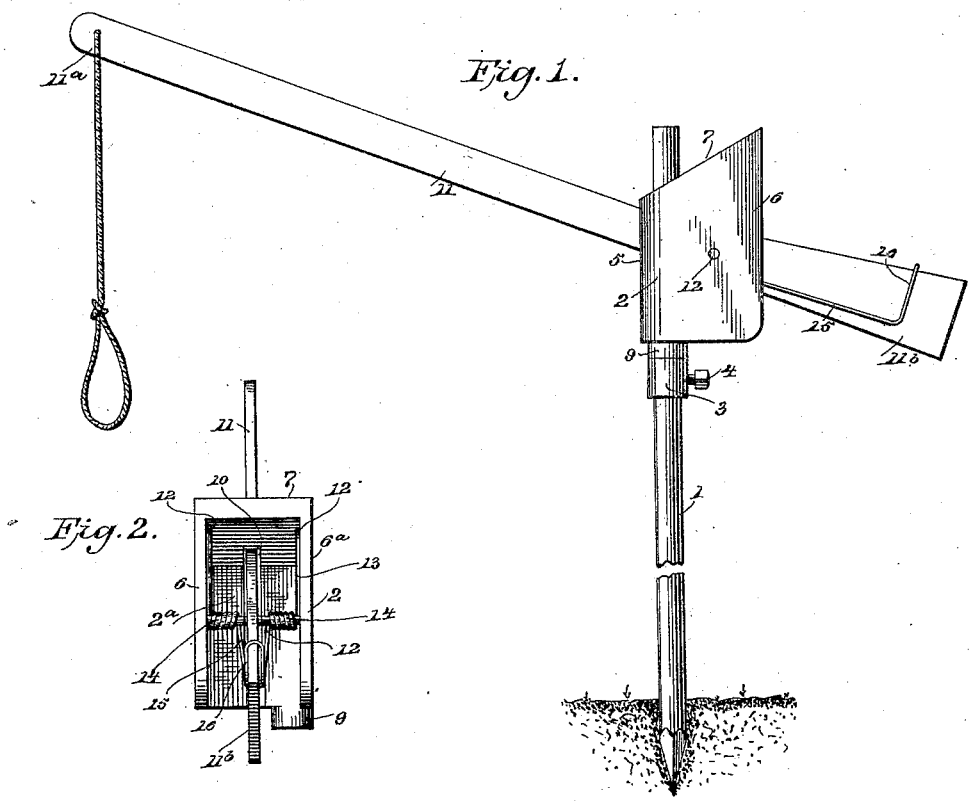
Figure 2:
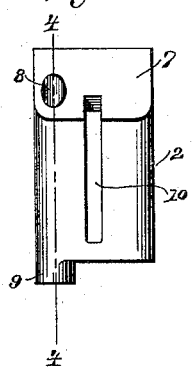
Figures 3, 4:
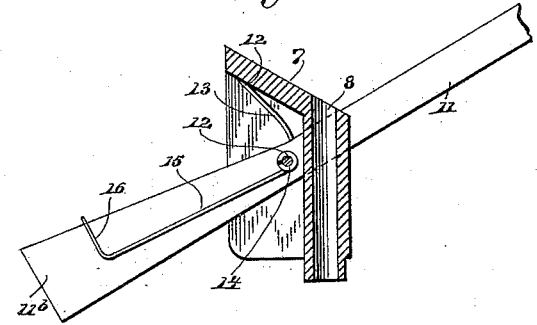

In the accompanying drawings, Figure 1 is a side elevation of the device. Fig. 2 is a rear view showing the stake or staff removed. Fig. 3 is a front view of the head-block. Fig. 4 is a section on line 4 4, Fig. 3.

1 represents the stake or staff; 2, the head-block; 3, a collar on the stake, and 4 a set-screw by which the collar is secured at different heights on the stake to raise or lower the head-block.

The head-block 2 is of peculiar construction, as follows: 5 is the front, 6 6$^a$ the sides, and 7 the top, which is inclined from the front upwardly. The block is hollowed out at 2$^a$ and is open at the rear and bottom, the walls of the recess being substantially parallel with the top and sides of the block. At the bottom and rear of the sides 6 6$^a$ the corners are rounded off. At the corner of the block formed by the front and the side 6 is a vertical perforation or opening 8, that extends down through a circular boss 9, that rests upon collar 3. Through this perforation the upper end of the stake 1 passes to permit adjustment of the head-block thereon.

At the front of the head-block is a vertical slot 10, that extends to the top 7 and is continued about half-way up the same. Adapted to work in a vertical plane in this slot 10 is a lever 11, which is fulcrumed on a pin 12, extending across the hollow portion of the block and fixed in the sides 6 6$^a$. The front end of the lever to which the halter of the animal is connected at 11$^a$ is considerably longer than the rear end 11$^b$. For the purpose of making the lever act as a bough of a tree (to which animals are frequently secured, because of its resilience and play) the rear end 11$^b$ of the lever 11 is depressed by a suitable spring, now to be described, for the purpose of throwing its front end upwardly. A piece of wire has its extreme free ends secured at 12 12 to the rear of the top 7 of the head-block, the ends 13 13 extending upwardly from the outer ends of the pin, where the wire is coiled around the pin from the ends of the latter inwardly and close to the lever 11, forming coils 14 14, and from these coils the middle portion of the wire extends from the under side of the pin in the form of a loop 15, which embraces the rear end of the lever and has an upturned part 16 that engages with the top of said end. The action of this loop 15 being downward, it throws the rear end of the lever downward and its front end upward, thus permitting the necessary play of the lever, as may be required by the animal.

As the stake 1 passes loosely through the opening 8, the head-block is free to rotate, thus permitting the lever to swing around in a circle.

What we claim as new is—

In a tether, the combination of a stake, a head-block supported thereon so as to turn, and a spring-operated lever fulcrumed in said block, said block being constructed with a front 5, sides 6 6$^a$, an inclined top 7, into which the upper end of a vertical slot in the front 5 extends, and a boss 9, through which extends a perforation at one corner of the block to receive the stake, said vertical slot permitting vertical play of the lever, substantially as set forth.

In testimony that we claim the foregoing as our own we have hereto affixed our signatures in presence of two witnesses.

FRANCIS M. POWELL.
    WILLIAM H. VICKERY.

Witnesses:
 M. M. RICHARDSON,
 F. C. STEPHENSON.